…

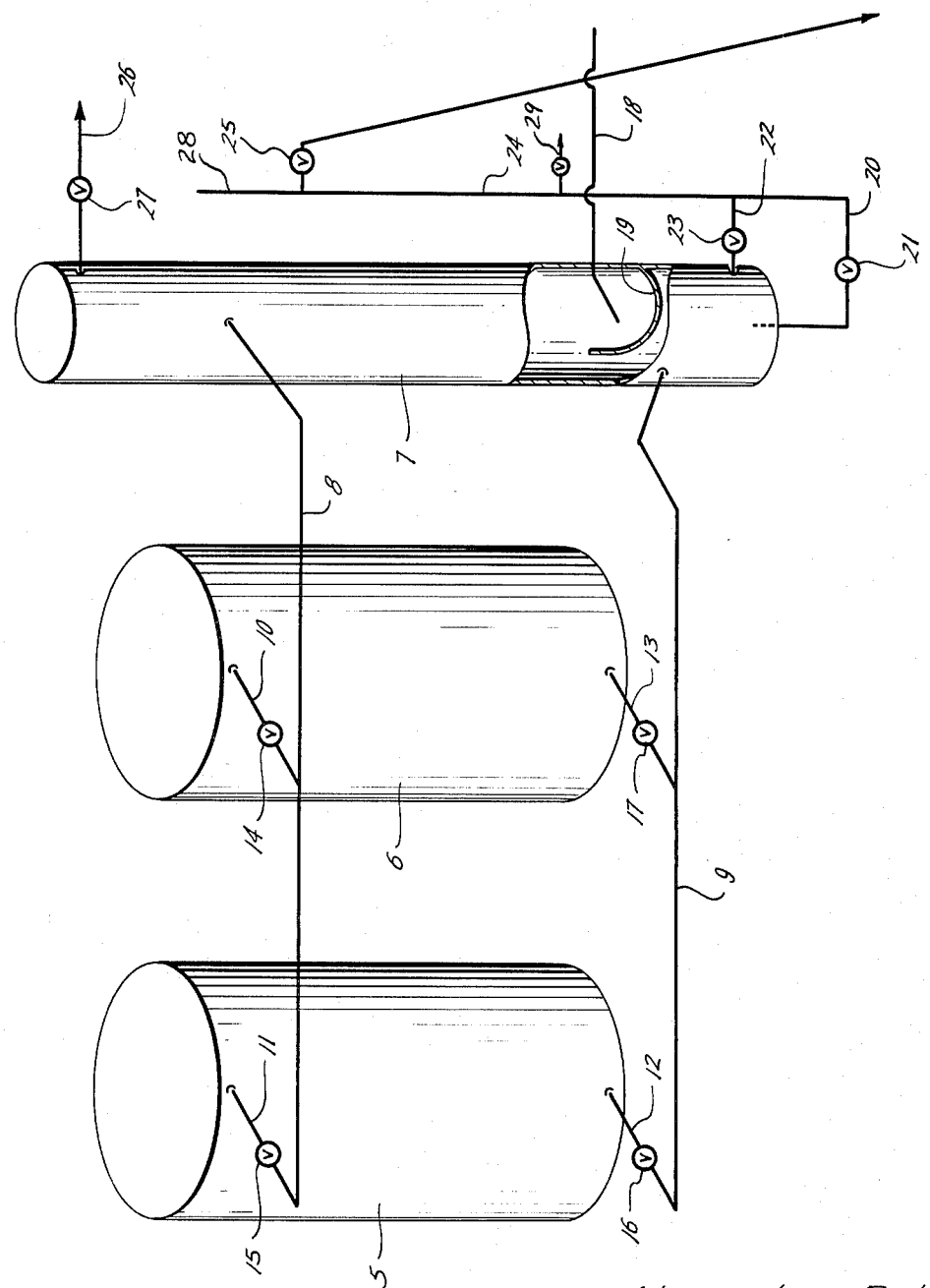

United States Patent Office 3,198,337
Patented Aug. 3, 1965

3,198,337
APPARATUS FOR SEPARATING IMMISCIBLE
FLUID PHASES
Alexander Peters, Jr., 204 E. Cherry, Robinson, Ill.
Filed June 22, 1961, Ser. No. 118,847
3 Claims. (Cl. 210—533)

This invention relates to means for the separation of immiscible fluid phases and is particularly concerned with the provision of means for the separation of the oil and water phases of a fluid such as crude oil.

It is an object of the present invention to provide an apparatus which will capitalize on the natural tendency of immiscible fluids to separate to achieve that effect with a minimum of equipment.

Another object of the present invention is to provide means for the separation of immiscible fluids adapted to minimize the need for treatment of said fluid with heat and/or chemicals.

A further object of this invention is to provide apparatus of the type described which is of simple construction and adapted to easy maintenance and operation.

Still another object of this invention is to provide apparatus for the separation of immiscible fluids adapted to be operated at a minimum of cost.

Still other objects and advantages of the present invention will become apparent from the following general and specific description of one embodiment thereof which is illustrated schematically in the accompanying drawing.

The drawing is a schematic illustration of one embodiment of the present invention and illustrates its employment with a plurality of storage vessels.

In the drawing reference numerals are employed as follows:

| 5 | storage tank | 18 | inlet line |
| 6 | storage tank | 19 | baffle |
| 7 | tank | 20 | drain line |
| 8 | trunk conduit | 21 | valve |
| 9 | trunk conduit | 22 | drain line |
| 10 | feeder conduit | 23 | valve |
| 11 | feeder conduit | 24 | trap |
| 12 | feeder conduit | 25 | valve |
| 13 | feeder conduit | 26 | outlet line |
| 14 | valve | 27 | valve |
| 15 | valve | 28 | breather |
| 16 | valve | 29 | flushing drain |
| 17 | valve | | |

*In general.*—The illustrated embodiment comprises three intercommunicating tanks, two of which are disposed in positional relation to the first, communication between the tanks being achieved by means of a pair of spaced, horizontally disposed, valved conduits. The first tank, the bottom wall of which is disposed lower than the bottom walls of the other two tanks, has a fluid inlet line opening through its side wall at a point intermediate the entry thereinto of the intercommunicating valved conduits. Below the level of the lowermost of the intercommunicating valved conduits there is then provided a valve outlet, adapted to drain the system.

*More particularly.*—The illustrated embodiment comprises a pair of storage tanks 5 and 6 each of which has a top and bottom wall and a continuous side wall, and a third tank 7, which is of greater height and lesser diameter than tanks 5 and 6. Though standing in spaced relation, tanks 5 and 6 are so positioned that their bottom walls lie in the same horizontal plane. This may be easily and conveniently done by erecting tanks 5 and 6 on top of a platform or other suitable stage or support means.

Tank 7 also stands in spaced relation to each of tanks 5 and 6 but is so positioned relative thereto that its bottom wall lies in a horizontal plane which is lower than the plane defined by the bottom walls of tanks 5 and 6.

Intercommunicating tanks 5, 6 and 7 are a pair of trunk conduits 8 and 9 and integral feeder conduits 10, 11, 12 and 13, provided with valves 14, 15, 16 and 17 respectively. As shown, conduits 9, 12 and 13 intercommunicate tanks 5, 6 and 7 between points adjacent the bottom of tanks 5 and 6 and a point in the lower portion of tank 7 which is in spaced relation to the bottom wall thereof and is, relative to the horizontal, below the level at which conduits 12 and 13 enter tanks 5 and 6. Likewise, conduits 8, 10 and 11 intercommunicate tanks 5, 6 and 7 between points in near proximity to the top of tanks 5 and 6 and a point in the upper portion of tank 7 and, as shown, conduits 8, 10 and 11 lie in a horizontal plane.

Entering tank 7 at a point intermediate the level at which conduits 8 and 9 enter thereinto is a fluid inlet line 18 which terminates within tank 7. In spaced relation to line 18 is a baffle 19 secured to the inner wall of tank 7 as by welding.

Leading out of tank 7 through the bottom wall thereof is a drain line 20 equipped with a valve 21. An alternate drain line 22 provided with a valve 23 then leads out of tank 7 through the side wall thereof at a point below the level of entry thereinto of conduit 9. Both of drain lines 20 and 22 then communicate with trap 24 which is valved as indicated at reference numeral 25, equipped with a breather 28, a flushing drain 29 and which extends to any convenient discharge pit or other disposal means. Moreover, tank 7 may optically be internally equipped with one of the well known heating elements employed in fluid phase separation though such an element is not shown and does not form a part of this invention.

Further, if it is desired or required to service a fluid having a gas or vapor phase, provision for the extraction of that phase is provided by means of gas outlet line 26 and its associated valve 27. As shown, line 26 leads out of tank 7, through the wall thereof, at a point above the level of intercommunicating conduit 8.

While the present invention, and of course the herein described and illustrated embodiment thereof, may be employed to separate various immiscible fluid phases, as for example gas, oil and water, particular utility has been found in the separation of the oil and water phases of crude petroleum. Thus, a typical example of the apparatus of the present invention may be had with reference to utilization of the illustrated embodiment in the separation of the immiscible water and oil phases of crude petroleum.

When employed for this purpose, crude petroleum, from the wellhead or other convenient source, is fed into tank 7 to impinge the crude petroleum upon baffle 19 and commence phase separation. Continuing input through line 18, tank 7 is filled to the point where conduit 8 enters tank 7. In filling tank 7 to this point valves 14 and 17, as well as valves 25, 21 and/or 23, are kept open so that as tank 7 fills, water will fill trap 24; oil, followed by water, will flow into tank 6 through conduit 9; and ultimately, oil will flow into tank 6 through conduit 8, valves 15 and 16 being closed to take tank 5 off-stream.

Concurrently the oil-water interface in tank 7 is positioned below the level at which conduits 12 and 13 enter tanks 5 and 6 respectively and, preferably adjacent to or somewhat below the point at which conduit 9 enters tank 7. This is conveniently done by adjustment of the level of the apex of trap 24 which is always disposed somewhat below the level at which conduit 8 enters tank 7.

With the system thus balanced tank 6 continues to be filled with oil from the top of tank 7 through conduit 8 while water, drains out of tank 6 into the bottom of tank 7 through conduit 9. Further, when the oil-water interface in tank 7 is held at or below the entry thereinto of conduit 9 oil from tank 7 will also move into tank 6 by counterflow through conduit 9 thereby accelerating the time required to oil-fill and water-remove tank 6.

When tank 6 is thus oil-filled and water-removed tank 5 may be put on-stream by closing valves 14 and 17 and opening valves 15 and 16. Optionally of course the system may simply be shut down and if desired excessive spillage, from or filling of one tank may be obviated by the provision of conventional equalizing lines.

If, during operation, troublesome sludges build up in the system it may be effectively flushed by means of valved flushing drain 29. Further, it has been found, apparently as a result of the flow cycle provided by this invention including the oil-water counterflow that may be had through conduit 9, that emulsion breakdown is provided. Thus, while the method and apparatus of the present invention may be employed in conjunction with such other separation techniques as heat and/or emulsion-breaking chemicals such adjuncts have, in many applications, been found of no aid whatsoever. Further, if a gas or vapor phase be present in the fluid being processed, the same will readily be broken out for collection at, and removal from, the upper portion of tank 7 by means of outlet 26 and valve 27.

From the foregoing it will be seen that the method and apparatus of the present invention provides a plurality of advantages to the art of fluid phase separation. Moreover, it has been found that the present invention is of equally important utility in such operations as the rolling of tank bottoms and emulsion breaking. Further, experience has demonstrated that a particularly significant advance is provided to separation and related operations by the present invention for the reason that, unlike prior art systems, it is not subject to easy freeze-up in cold weather operation.

While the specification and drawing hereof have illustrated but one embodiment of the present invention, the invention itself is of much broader scope and will admit of various embodiments which have not been described or illustrated herein. Thus, the embodiment here illustrated and described is given solely for the purpose of enabling one skilled in the art to practice this invention and is not to be construed as limiting the scope of the invention.

What is claimed is:

1. Apparatus for separating immiscible fluids, said apparatus comprising, in combination;
   a first vessel;
   a second vessel of small diameter relative to the diameter of said first vessel and having its bottom wall portion disposed, relative to the horizontal, lower than the bottom wall portion of said first vessel;
   a first conduit means communicating said vessels, said first conduit means leading out of said first vessel at a point adjacent its bottom and entering said second vessel at a point which, relative to the horizontal, is lower than its point of departure from said first vessel;
   a second conduit means communicating said vessels, said second conduit means leading out of said first vessel at a point above said first conduit and entering said second vessel at a point which, relative to the horizontal, is level with its point of departure from said first vessel;
   means for charging said second vessel with fluid, said means entering said second vessel at a point intermediate the entry thereinto of said first and second conduit means; and
   means for the regulated drainage of said second vessel from below the point at which said first conduit enters into said second vessel.

2. Apparatus for separating immiscible fluids, said apparatus comprising, in combination;
   a first vessel;
   a second vessel positioned relative to said first vessel and having its bottom wall portion disposed, relative to the horizontal, lower than the bottom wall portion of said first vessel;
   a first valved conduit means communicating said vessels, said first conduit means leading out of said first vessel at a point adjacent its bottom and entering said second vessel at a point which, relative to the horizontal, is at least as low as its point of departure from said first vessel;
   a second valved conduit means communicating said vessels, said second conduit means leading out of said first vessel at a point above said first conduit and entering said second vessel at a point which is level with its point of departure from said first vessel;
   means for charging said second vessel with fluid, said means entering said second vessel at a point intermediate the entry thereinto of said first and second conduit means; and
   means for the regulated drainage of said second vessel from below the point at which said first conduit enters into said second vessel.

3. Apparatus for separating immiscible fluids, said apparatus comprising, in combination;
   a first vessel;
   a second vessel positioned relative to said first vessel and having its bottom wall disposed, relative to the horizontal, lower than the bottom wall of said first vessel;
   a first valved conduit means communicating said vessels for flow of fluid in both directions therein, said first conduit means leading out of said first vessel at a point adjacent its bottom and entering said second vessel at a point which, relative to the horizontal, is at least as low as its point of departure from said first vessel;
   a second valved conduit means communicating said vessels, said second conduit means leading out of said second vessel at a point above said first conduit means and entering said first vessel at a point which, relative to the horizontal, is at least as high as its point of departure from said second vessel;
   separate means for charging said second vessel with fluid, said charging means entering said second vessel at a point intermediate the entry thereinto of said first and second conduit means; and
   means for the regulated drainage of said second vessel from below the point at which said first conduit means enters into said second vessel.

References Cited by the Examiner

UNITED STATES PATENTS

| 1,490,462 | 4/24 | Gill | 55—172 X |
| 1,750,490 | 3/30 | Pippin | 210—114 |
| 1,777,535 | 10/30 | Stratford | 55—176 |
| 2,400,713 | 5/46 | Rhees | 210—83 |
| 2,882,995 | 4/59 | Smith | 55—174 X |
| 2,986,279 | 5/61 | Henigman | 210—83 X |

REUBEN FRIEDMAN, *Primary Examiner.*

HERBERT L. MARTIN, *Examiner.*